Oct. 14, 1969    J. H. JOHNSON    3,472,567
FILAMENT WOUND BEARING CAGE
Filed Aug. 9, 1967    2 Sheets-Sheet 2
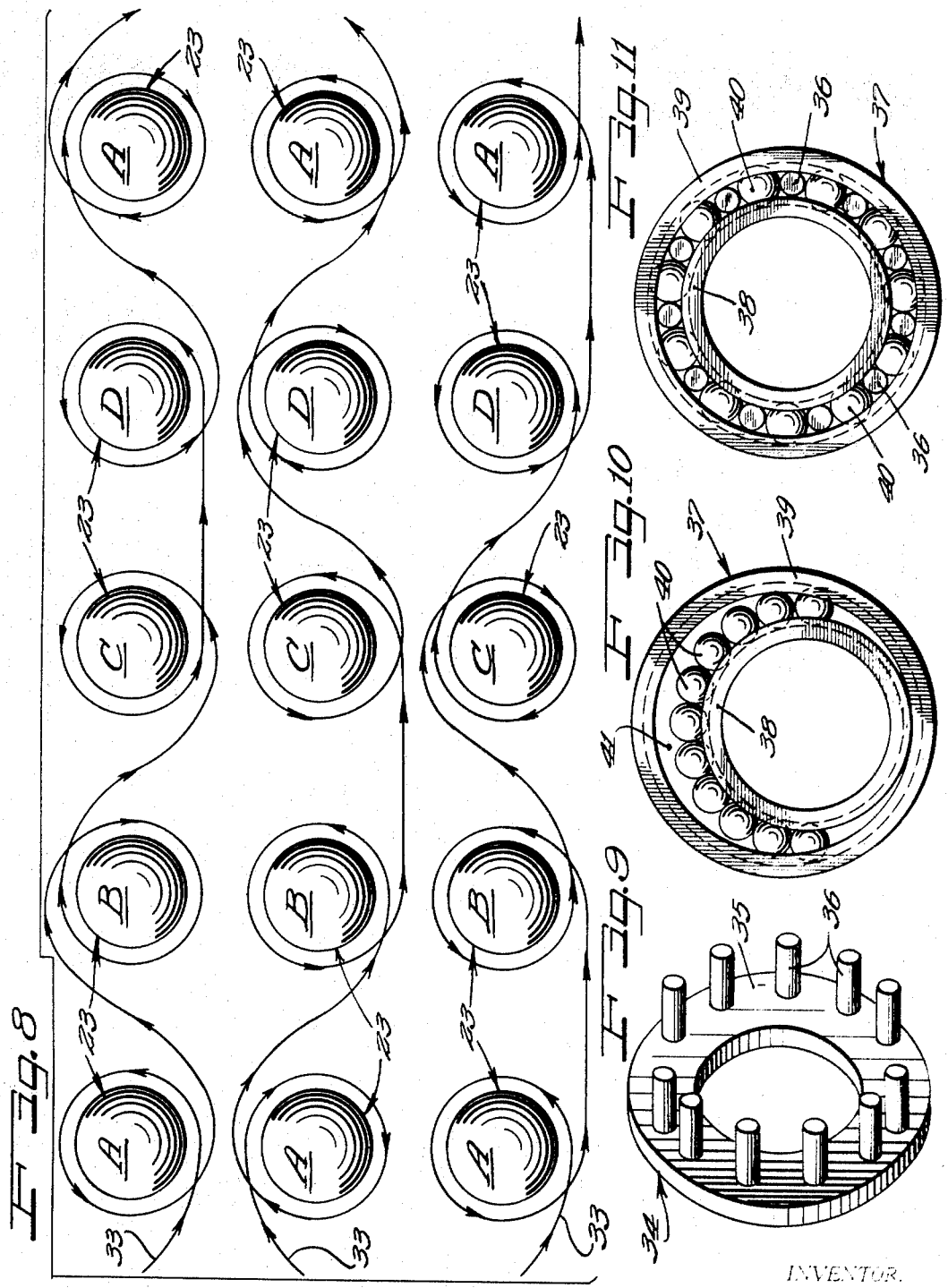
INVENTOR.
John H. Johnson
BY Hill, Sherman, Meroni, Gross & Simpson    ATTORNEYS United States Patent Office 3,472,567
Patented Oct. 14, 1969

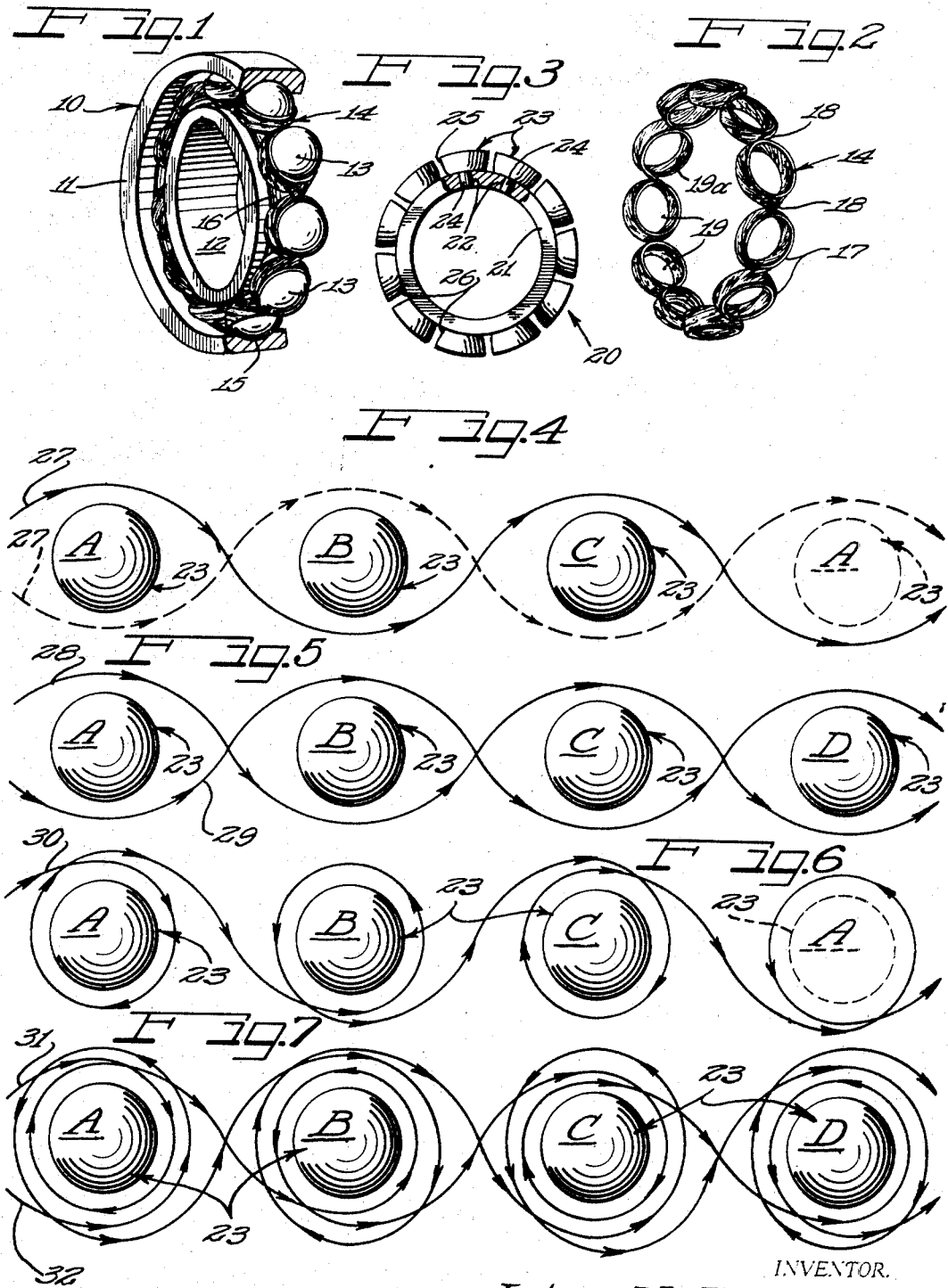

3,472,567
FILAMENT WOUND BEARING CAGE
John H. Johnson, Wayne, Pa., assignor to TRW Inc., Cleveland, Ohio, a corporation of Ohio
Filed Aug. 9, 1967, Ser. No. 659,460
Int. Cl. F16c 19/20, 33/38; B23p 17/00
U.S. Cl. 308—201                     12 Claims

ABSTRACT OF THE DISCLOSURE

A cage or separator for the anti-friction elements of bearings which is composed of wound filament material with the filament windings fused or bonded together providing a ring of peripherally spaced pockets for the anti-friction elements. The filament wound cage may be wound separately on a fixture or may be wound in situ in the bearing around the anti-friction elements.

BACKGROUND OF THE INVENTION

The present invention relates to the field of cages, separators, or retainers for ball and roller bearings. Such bearings require a separator to equally space the rolling elements around the race ways of the bearing rings, and to prevent these elements from rubbing against each other. In some designs, the separator should have a contoured pocket to prevent the rolling elements from dropping out when one of the bearing rings is removed. Such separators serve as retainers during assembly operations. Cages, retainers or separators should be light in weight, have a high strength, and possess some degree of flexibility. In addition, it is important that they be low in cost. In general, it is difficult to combine all of these factors advantageously.

The term "cage" as used herein, will include retainers, spacers, and separators for the anti-friction elements of ball bearings and is not confined to any particular structure or design. Generally, a bearing "cage" is a ring of circumferentially or peripherally spaced pockets for the bale or roller elements of anti-friction bearings.

The term "filament" as used herein, will include all strand, thread, wire, or yarn materials whether or not composed of twisted together fibers or monofilaments.

The term "bonded" as used herein, will include any type of bond whether bound by fusion of the filament material itself, or by added bonding agents or cement.

DESCRIPTION OF THE PRIOR ART

Bearing cages have usually been made from metal stampings, but the prior art also includes bearing cages composed of plastic materials. For example, the L. D. Cobb patent, No. 2,550,911, and the K. P. Goodwin et al. patent, No. 2,550,912, show ball cages composed of plastic material. The F. Allendorff patent, No. 2,035,417, shows a bearing cage composed of resin impregnated fabric material. The M. Staunt patent, No. 2,911,268, shows a ball cage made of plastic having lubricating properties such as nylon or polyethylene. The M. C. Agnes patent, No. 3,135,564, shows the in situ formation of a bearing cage from a "plastisol."

Prior known plastic ball cages were cumbersome, and did not possess high strength-to-weight ratios.

SUMMARY OF THE INVENTION

This invention now provides a bearing cage composed of filament material which is wound in such a manner as to form closed annular ball or roller pockets or cocoons composed of super-imposed filament portions which will freely receive the ball or roller elements and hold them in the proper circumferentially spaced relationship on the race ways of the inner and outer bearing rings. The pockets or cocoons are connected by super-imposed filament portions joining the pockets into a ring of circumferentially spaced pockets. The filament is wound into a ring of these cocoons or pockets which are radially open ended so that the ball or roller elements may engage the bearing race ways. Filament material is fixed in its wound shape by bonding the filament wrapping windings together. While a preferred bonding agent is a thermo-setting resin material, the bonds can be formed by heat fusion or in any other manner.

The bearing cages of this invention may be wound in situ around the anti-friction elements between the bearing rings or they may be formed outside of the bearing as by winding the filament on a fixture.

A feature of the invention includes the provision of a one-piece bearing cage adapted for deep groove bearings heretofore requiring two-piece cages that are put in place after the anti-friction elements and bearing rings have been assembled. The wound filament cage construction of this invention permits the cage to be built-up in one piece in the assembled bearing.

Another feature of the invention is the use of fugitive materials such as waxes or the like to provide running clearance between the anti-friction elements and the cage.

It is then an object of this invention to provide an anti-friction element cage for bearings composed of a wound filament material having a very high strength-to-weight ratio.

Another object of this invention is to provide a bearing cage composed of wound filament material having the windings bonded together.

A specified object of this invention is to provide a bearing cage composed of resin impregnated filament material wound to provide a ring of anti-friction element receiving pockets.

A further specific object of this invention is to provide a one-piece filament wound bearing cage for ball bearings.

Other and further objects of this invention will become apparent to those skilled in this art from the following detailed description of the preferred embodiments of the invention.

BRIEF DESCRIPTION OF THE DRAWINGS

FIGURE 1 is a fragmentary perspective view of a ball bearing unit squipped with a filament wound bearing cage according to this invention;

FIGURE 2 is a perspective view of the bearing cage in the assembly of FIGURE 1;

FIGURE 3 is a side elevational view of a fixture on which the bearing cage of FIGURES 1 and 2 may be wound;

FIGURE 4 is a diagrammatic view illustrating the manner in which a bearing cage may be wound from a single filament according to this invention, provided an odd number of pockets are required;

FIGURE 5 is a view similar to FIGURE 4, but illustrating the manner in which a bearing cage of this invention may be wound from two filaments to provide a cage having an even number of pockets;

FIGURE 6 is a view similar to FIGURES 4 and 5, but illustrating the method of winding a single filament to produce a bearing cage according to this invention without V grooves or recesses in the pockets;

FIGURE 7 is a view similar to FIGURE 6 illustrating a filament winding technique with two filament strands;

FIGURE 8 is a view similar to FIGURES 4–7, but illustrating the single strand winding technique involving the programming of a skip in the sequence of wrapping around the ball pockets;

FIGURE 9 is a perspective view of a fixture for separating the anti-friction elements in a bearing to accommodate the in situ winding of a bearing cage according to this invention;

FIGURE 10 is a side elevational view of a ball bearing assembly illustrating the manner in which the ball units are initially positioned between the bearing rings; and FIGURE 11 is a view similar to FIGURE 10, but showing the manner in which the ball elements are separated by the fixture of FIGURE 9.

DESCRIPTION OF THE PREFERRED EMBODIMENTS

Bearing unit 10 of FIGURE 1 includes an outer bearing ring 11, an inner bearing ring 12, a ring of circumferentially spaced ball elements 13 between the rings 11 and 12, and a wound filament bearing cage 14 according to this invention. The outer ring 11 has an internal groove or race way 15 around its internal periphery and the inner ring 12 has a similar groove 16 around its outer periphery. The race ways 15 and 16 receive the ball units 13 in rolling engagement.

The ball cage 14, as best shown in FIGURE 2, is an annulus or ring of eleven circumferentially spaced pocket forming rings 17 joined together by crossover filament windings 18 therebetween. The rings 17 are each radially disposed and provide radially open ended cylindrical pockets 19 receiving the ball elements 13.

The cage 14, having an odd number of rings 17, may be formed from a single filament strand on a fixture 20, shown in FIGURE 3. This fixture 20 has a circular disk body 21 with eleven equally spaced radial holes 22 around the periphery thereof. Winding heads or mandrels 23 have cylindrical stems 24 seated in the holes 22 in snug but removable relation. Each head 23 has a cylindrical periphery 25 sized to form the pocket 19 for the ring 17 of the cage 14. A tapered or beveled portion 26 is formed at the lower end of the cylindrical head to provide an inwardly curved form to produce a lip 19a around the inner end of the pocket 19. This inturned lip 19a prevents the ball elements 13 from dropping through the cage pockets 19.

As illustrated in FIGURE 4, a single filament strand 27 is wound around the heads 23. Three such heads are designated A, B and C, respectively, to illustrate an odd number of pockets for the cage. A fourth head, shown in dotted lines, represents a repeat of the first head A. Thus, when the filament is started around the top half of the head A, shown in full lines, and then wound alternately under and over the successive heads, B and C, the strand will pass under the head A shown in dotted lines. Because an odd number of pocket forming rings 17 is involved, the single strand 27 will, in a single pass around the body 21 of the fixture 20, automatically alternate over and under the winding heads or mandrels 23. The winding is continuous in a sinuous path around the winding heads or mandrels 23. The number of passes of the filament around the fixture 20 will be controlled by the thickness of the strand and the desired height and thickness of the bearing rings 17. As shown in FIGURE 2, the crossover portions 18 are of less height than the cylindrical rings 17, and this is due to the inclined or biased paths of the strands as they alternately wrap first on one side and then on the other side of the pocket forming heads 23.

The strand 27 is preferably thermo-setting plastic impregnated glass fiber, and when the cage 14 is completely wound on the fixture 20, the assembly is heated to thermally set the resin. Upon setting, the cage 14 is rigid and self-supporting. The heads 23 are then removed from the center disk 21 and the finished cage 14 is removed from the disk 21.

If an even number of pocket forming rings 17 is desired, a winding pattern as illustrated in FIGURE 5 may be used. As therein shown, four winding heads 23 A through D are illustrated. The filament strand 28, starting on top of the head 23A, will end-up on the bottom of the head 23D, because an even number of pocket rings 17 are being formed and then on the repeat turn, it would end-up on the same side of the head 23A where it started. Because the strand 28 cannot always end-up on the same side of the mandrel heads 23 and still form pocket rings 17, it is necessary to use a second filament strand 29 starting on the opposite side of the mandrel heads. Thus, when two strands, 28 and 29, alternate with each other, the pocket rings 17 can be formed even though an even number of pocket rings is involved. If it is desired, the crossover portions 18, between the pocket rings 17, may be lock-stitched together.

Since both the single and double strand simple winding arrangements of FIGURES 4 and 5 will produce V grooves in the ring pockets at the crossover areas, a winding pattern, such as that shown in FIGURE 6, may be used to avoid the V formations. As shown in FIGURE 6, an odd number of winding heads 23A through C is involved, with the repeat head 23A being shown in dotted lines. The filament strand 30 is then initially wound completely around the head 23A for one full turn starting with the top of the head and ending up at the top of the head. Next, the strand is brought down under the bottom of the successive head 23B and thence for a full turn around this head. This pattern is repeated each time, wrapping a full turn around each successive head and with the crossovers leaving one side of the head to pass to the opposite side. Because an odd number of winding heads is involved, the pattern of FIGURE 4 may be followed, except that each pass includes a full turn wrap around the winding head. This prevents the V grooves from being formed in the pockets.

In the event an even number of pockets is to be formed and the V grooves are to be eliminated, the double strand wrap-around pattern of FIGURE 7 may be used. As therein shown, the first strand 31 starts at the top of the head 23A, makes one complete turn around the head and then passes to the underside of the next head 23B. The second strand 32 starts with the bottom of the first head 23A, makes one full turn therearound and then crosses over to the top of the successive head 23B. The pattern is repeated with each strand 31 and 32 making a complete pass around each successive mandrel head 23 and always ending up in the proper position after a complete pass around the ring because an even number of heads 23 is involved.

A skip-wrap technique, illustrated in FIGURE 8 may also be used. As therein shown, an even number of mandrel heads 23 is involved, with the head A being reproduced to illustrate the end of the first pass around the ring. A single strand 33 is wrapped for one complete turn around the first head A starting and ending on the bottom side thereof and is then passed over to the top of the successive head 23B where it is wrapped for one full turn and ending up, of course, at the top of this head. Next, the strand passes under the head C for one full turn thereinaround, but instead of being passed to the top of the successive head 23D, it is passed directly from the bottom of the head C to the bottom of the head D. This provides a skip in the crossover pattern which occurs between the heads C and D with the repeat pattern starting over the top of the head A shown in dotted lines to reproduce the opposite side of the head regardless of whether and even or an odd number of pockets is involved.

Next, on the second pass of the filament 33, the skip is between the heads B and C so that the repeat pattern will end-up on the opposite side of the head A. Next, the skip is between the heads A and B on the third pass around the ring. This skip, by being programmed into the winding to retrogress on each successive pass, will automatically position the filaments on alternate sides of the winding heads.

Therefore, from the various patterns illustrated in FIGURES 4 to 8, it will be understood that many different winding arrangements may be used with the filament material always being wound completely around the circumference of the winding fixture on successive passes which produce the desired contour for the pockets.

If it is desired to form the bearing cage in situ in the bearing, the arrangement of FIGURES 9 to 11 may be used. As therein shown, a fixture 34 is provided to separate the anti-friction elements in the bearing assembly so that a sewing machine or other device can be used to wind the cage around the elements between the bearing rings. The fixture 34 includes a flat ring 35 with pegs 36 projecting laterally from one face thereof and in equally spaced relation.

As shown in FIGURES 10 and 11, a bearing 37, to receive a cage in situ therein, includes an inner bearing ring 38, an outer bearing ring 39 and a plurality of ball bearing elements 40 between the rings and riding on the race ways thereof, as described in connection with FIGURE 1. The ball bearing elements 40 are assembled between the rings 38 and 39 in a conventional manner by dropping the inner ring 38 against the bottom of the outer ring 39, thus opening a crescent-shaped gap 41 into which the desired number of ball elements 40 can be received. Next, the fixture 34 is inserted between the rings so that its pegs 36 will equally space the ball elements around the rings as shown in FIGURE 11. With this equal spacing of the ball elements, the rings 38 and 39 are, of course, held together against axial displacement because the balls 40 ride in the deep grooves or race ways provided in these rings. Next, the rings 38 and 39 are subjected to a thrust load which will lock the ball elements in position therebetween. The fixture 34 is then withdrawn and filament is found around the ball elements 40 between the inner ring 38 and the outer ring 39 to form a cage such as 14 of FIGURE 2. Any desired winding technique can be used, including a sewing machine stitch technique with the two filaments being chain stitched at the crossover points between the ball elements. After the cage has been wound and while the ball elements are still locked in position due to the thrust load on the rings, the thermo-setting plastic impregnated in the filament may be heat-set.

If desired, and in order to provide free running clearance between the ball elements and the bearing cage, the balls may be coated with a fugitive material such as a wax, plastic, or the like, which will melt off when the assembly is heated to set the resin. Fugitive materials that will dissolve in solvents which will not attack the thermo-set resin for the cage can be used.

Numerous filament materials are available, and the following table gives some examples of possible filaments, together with their physical properties such as specific gravity, melting or decomposing points, and tensile strengths:

| Filament material | Specific gravity | Melting point, °F. | Tensile strength, p.s.i. 10³ |
|---|---|---|---|
| Acrylic | 1.2 | 450 | 70-120 |
| Aluminum | 2.70 | 1,220 | 97 |
| Aluminum oxide | 3.97 | 3,780 | 100 |
| Aluminum silica | 3.90 | ¹ 3,300 | 600 |
| Asbestos | 2.50 | 2,770 | 200 |
| Beryllium | 1.84 | 2,343 | 190 |
| Boron | 2.30 | 3,812 | 500 |
| Carbon | 2.50 | 6,700 | 500 |
| Cotton | 1.60 | ¹ 275 | 50-110 |
| Fluorocarbon | 2.2 | ² 525 | 40 |
| Glass (type "S") | 2.49 | 3,000 | 700 |
| Graphite | 1.50 | ² 6,600 | 400 |
| Molybdenum | 10.20 | 4,730 | 200 |
| Polyamide | 1.14 | 480 | 120 |
| Polyester | 1.40 | 480 | 100 |
| Quartz (fused silica) | 2.20 | 3,500 | 1000 |
| Steel | 7.87 | 2,920 | 600 |
| Tantalum | 16.60 | 5,425 | 90 |
| Titanium | 4.72 | 3,035 | 280 |
| Tungsten | 19.30 | 6,170 | 620 |
| Wool | 1.3 | ¹ 212 | 29 |

¹ Decomposes.  ² Sublimes.

Binding materials for the filaments, such as those set forth in the above table, are also quite numerous. Polyester resins have been used. Epoxy resins are preferable. An epoxy resin known as bisphenol A-epichlorohydrin is most widely used.

The polyesters are somewhat more brittle than the epoxies, and the epoxy temperature ranges may be low, being limited to around 300° F.

Phenolic resin binders exhibit higher temperature resistance, up to 600° F., but usually are not as strong as the epoxies at room temperature.

Silicone resins, like the phenolics, do not have the mechanical strength characteristics of the organic resins at room temperature, but at 400° F. to 500° F. they do not weaken and are very useful for prolonged operation.

Polybenzimidazole polymers (PBI) have been found to be quite useful at temperatures between 700° F. and 1000° F.

In the low-mid temperature ranges, polyurethane resins have been found to be useful.

Polyimide resins are useful and have been found to retain their strength at 600° F. for 1000 hours or more.

Polyphenylene oxide (PPO) is highly desirable where heat resistance is a factor.

When the filament material takes the form of a metal wire, the wound strand can be fused together at induction produced elevated temperatures just sufficient to effect fusion.

Ceramic and metal spraying can be used with the filaments and diffusion bonding is also useful.

From the above descriptions it will, therefore, be understood that this invention now provides an exceedingly strong and light weight bearing cage formed from wound filament material with the filament windings being bonded together either by fusion of their own material or by the use of added bonding agents. A convenient method of bonding involves the use of thermo-setting resin impregnated filament material which will set-up after the winding operation to produce the cage capable of retaining its own shape.

Although minor modifications might be suggested by those versed in the art, it should be understood that I wish to embody within the scope of the patent hereon granted, all such modifications as reasonably and properly come within the scope of my contribution to the art.

I claim as my invention:

1. An anti-friction element cage for bearings comprising a ring of circumferentially spaced closed annular pockets with radially spaced open inner and outer peripheral ends and a continuous radial wall extending between said ends and portions between the pockets joining the pockets into the ring, said cage being formed of a flexible filament wound to provide a plurality of superimposed filament portions forming the continuous radial walls of the pockets and the portions between the pockets which join the pockets into the ring, and means bonding the superimposed filament portions together in fixed pocket and ring shape.

2. The anti-friction element cage of claim 1 wherein the filament is Fiberglas.

3. The anti-friction element cage of claim 2 wherein the Fiberglas is bonded with a thermo-set plastic.

4. The anti-friction element cage of claim 1 wherein the filament is metal wire.

5. The anti-friction element cage of claim 4 wherein the wire is bonded by heat fusion.

6. The cage of claim 1 wherein the radial walls of the pockets are contoured to embrace the anti-friction elements sufficiently to prevent the elements from dropping out of the pockets when the anti-friction elements are mounted therein.

7. The cage of claim 1 wherein the portions between the pockets are composed of filament portions which are crossed over alternately from opposite sides of the radial walls of the pockets.

8. The cage of claim 1 wherein a single continuous filament forms the entire cage.

9. The cage of claim 1 wherein two continuous filaments form the entire cage.

10. The method of making a bearing cage composed of a ring of circumferentially spaced closed annular pockets each with radially spaced inner and outer peripheral ends connected by a continuous radial wall and connecting portions between the pockets holding the pockets in ring defining relation which comprises winding a continuous flexible filament a plurality of times to provide superimposed filament portions defining said continuous radial walls of the pockets and said connecting portions, and bonding the superimposed filament portions together into fixed pocket and ring shape.

11. The method of claim 10 wherein the filament is wound sinuously and is crossed over between the pockets.

12. The method of claim 10 wherein the filament is wound with more turns around the pockets than are crossed over between the pockets.

References Cited

UNITED STATES PATENTS

| 449,964 | 4/1891 | Simonds | 308—199 |
|---|---|---|---|
| Re. 15,345 | 4/1922 | Robson | 308—217 |
| 1,733,673 | 10/1929 | Rouanet | 308—201 |
| 2,035,417 | 3/1936 | Allendorff | 308—201 |
| 3,047,191 | 7/1962 | Young | 29—419 |
| 3,068,552 | 12/1962 | Williams et al. | 29—419 |
| 3,075,278 | 1/1969 | Bratt | 308—217 |

FOREIGN PATENTS

| 584,120 | 1/1947 | Great Britain. |
|---|---|---|
| 45,913 | 10/1917 | Sweden. |

MARTIN P. SCHWADRON, Primary Examiner

FRANK SUSKO, Assistant Examiner

U.S. Cl. X.R.

29—419; 156—175